Nov. 10, 1970   H. A. ANDERSON   3,538,668
REINFORCED ARCHITECTURAL SHAPES
Filed Dec. 1, 1967   5 Sheets-Sheet 1

INVENTOR
Howard A. Anderson
BY Hooper, Leonard
& Buell
his ATTORNEYS

Nov. 10, 1970   H. A. ANDERSON   3,538,668
REINFORCED ARCHITECTURAL SHAPES
Filed Dec. 1, 1967   5 Sheets-Sheet 4

INVENTOR
Howard A. Anderson.
BY
HIS ATTORNEYS

Nov. 10, 1970   H. A. ANDERSON   3,538,668
REINFORCED ARCHITECTURAL SHAPES
Filed Dec. 1, 1967   5 Sheets-Sheet 5

INVENTOR
Howard A. Anderson.
BY

HIS ATTORNEYS

United States Patent Office 3,538,668
Patented Nov. 10, 1970

3,538,668
REINFORCED ARCHITECTURAL SHAPES
Howard A. Anderson, 2278 Meadow Road,
Ingomar, Pa. 15237
Continuation-in-part of application Ser. No. 518,414,
Jan. 3, 1966. This application Dec. 1, 1967, Ser.
No. 691,101
Int. Cl. E04c 2/26
U.S. Cl. 52—615                                  3 Claims

ABSTRACT OF THE DISCLOSURE

A number of architectural shapes are disclosed which can be assembled from a variety of constructional materials including framing lumber, plywood, fiber boards such as Celotex and Homasote, gypsum board, veneered panels and the like. These shapes are arranged in several configurations including beams, studs, and various sizes of panels useful for bearing walls, floors, roofs, partitions, curtain walls, interior and exterior doors, and the like. In the form of beams, the architectural shapes can be utilized in place of conventional wooden beams and in many cases in place of conventional steel beams or angle irons. Each shape includes at least two spaced shape members (which may or may not be co-extensive depending upon the application of the invention) spacedly secured by one or more spacing elements, each of which has uniquely serrated lateral edges which are embedded respectively in the spaced members. The roots of the serrations determine the extent of embedment and the overall thickness of the shape. The junctions among the spaced shaped members and the one or more spacing elements are sufficiently rigid that when beam loadings are applied to the shapes the loading is borne substantially entirely by compressional and tensional stresses (skin stresses) developed in the members. The invention also provides means and/or methods where required for the thermal and sound insulation of the shapes, for edgewise joining of the shapes, and for assembling the shapes.

---

The present application is a continuation-in-part of my co-pending application entitled Reinforced Architectural Panel filed Jan. 3, 1966, Ser. No. 518,414, now abandoned.

The present invention relates to reinforced architectural shapes wherein two or more members are maintained in spaced relationship by spacing and securing means, and more particularly to architectural shapes arranged for skin-stressed loadings and useful for doors, walls, stationary and movable partitions, curtain walls, bearing and non-bearing partitions, beams, studs, and the like. It is also contemplated that the architectural shapes of the invention can be employed in connection with floor and roofing structures where both strength and insulational qualities are usually necessary. In many of these applications, framing lumber such as used for beams, joists and studding can be minimized or eliminated altogether. When arranged in the form of a skin-stressed beam my architectural shape can obviate the use of conventional steel beams in many building applications.

Previous architectural shapes of this character have usually been confined to rather large panels, such as doors, and utilize securing and spacing means of complicated configurations. Manufacture of these prior panels is difficult and time-consuming. Moreover, such spacing means usually are adapted for securance to only one type of material. For example, cardboard or wooden spacers of various configurations are utilized for joining and spacing panels of plywood or similar materials. Such prior spacing means are joined to the panels by gluing (as typified by U.S. patents to Konstandt, 2,697,461; Konstandt, 2,633,439; Havens, 2,644,777 and Kloote, 2,760,-240), an operation which requires the application of heat and pressure in addition to the labor and time involved in the application of the glue to the spacing means or to the panel members. Thus the manufacture of such panels is laborious and time consuming. Moreover, the glue utilized frequently yields in the presence of moisture so that the panels so constructed are not reliable under all conditions of use.

In other arrangements, for example Swiss Pat. 371,240 and French Pat. 1,269,175, the spacing means of the panel are embedded in a settable material such as resin or plaster of Paris and such embedding is relied upon to secure the parts together. In any event, a separate application of such material to the panels to be joined is required, and there are no positive means for preventing the withdrawal of the joining means from the settable material.

The spacing members have been partially embedded in the material being joined as shown in Swiss Pat. 371,-240. The embedment is not limited by the spacing members themseleves, nor is there any certainty that the spacers will not be embedded to a greater extent in one panel member than in the other.

Serpentine spacers are shown in Belgian Pat. 526,780, which are also partially embedded in the members being joined. The spacers are not relied upon to secure the members together which are secured instead by bolts.

In still another prior arrangement, as described in U.S. Pat. 2,108,795 to Budd, a pair of metallic panels are secured to spacing and joining means secured edgewise between the panels by means of welding and simultaneous application of pressure to both sides of the panel being formed. In known types of architectural panels, however, there is no arrangement wherein a simple form of joining and spacing means for members made of wood or some softer material, can be secured simultaneously to both or all of the shape members in a single operation, as by the simple application of pressure to the assembly of members and joining means therebetween to form an architectural shape.

Such spacing means as are known cannot, moreover, be adapted for use with shaped members of various materials ranging for example from very soft material such as asbestos or wood fiber board to less soft materials such as wood. For example, in the U.S. patents to Kohl, Nos. 3,036,672 and 3,181,659, heavily constructed spacing means must be made of heavy gauge steel or other hard material and used to join materials having the hardness of aluminum or harder material. The Kohl spacing means are not adaptable for joining relatively soft materials such as wood, fiber board, and gypsum board.

The teeth of the Kohl spacing means are beveled or sharpened but are not set and therefore cannot spread to prevent separation, when used for softer materials. For the same reason the teeth of the Kohl spacing means would shear through relatively thin shape members and disrupt the outer surfaces thereof. In Kohl 3,181,659 the spacing means must be supported laterally while in Kohl 3,036,672 only circular spacing or securing means can be employed. The Kohl arrangements, moreover, do not provide means integral with the spacing means for precisely limiting the penetration thereof. In consequence, external means must be provided for determining the proper thickness of the Kohl panels, and there is no assurance that the teeth along one lateral edge of the spacing means will not become embedded to a lesser extent than the teeth along the other lateral edge.

Insofar as I am aware, no attempt has been made by the prior art to so securely join spacing elements to the members spacedly secured thereby that the members can be severely skin-stressed, i.e., loaded as a beam, without disloding the spacers from the members and disrupting the skin-stressed effect. Certainly, no means are available for fabricating a skin-stressible beam from ordinary structural lumber. The savings in structural steel is immediately apparent. Similarly there are no known means for forming skin-stressible studding members, especially from fire resistant strips of gypsum board or the like, which are spacedly and securely joined by my novel spacing elements. Indeed, entire sections of walls, curtain walls, and interior partitions can be made by spacedly and securely joining 4' x 8' sheets or other suitably sized panel members of gypsum board, plywood, or the like. As my novel spacing means are metallic, the fire resistance potentiality is readily apparent.

I overcome these deficiencies in the prior art by providing a variety of novel architectural shapes wherein two or more shape members of either the same or different materials are securely and spacedly joined, with the aid of the novel securing and spacing elements which I have also disclosed herein. The architectural shapes provided by my invention can be heavily loaded as beams, when necessary, and their strength is dependent upon the tensional and compressional forces (skin stresses) respectively in the members, whether panels or strips, which are thus joined.

The spacing and joining elements of my invention are arranged for spacedly joining members of various materials and of various shapes without the use of glue or other auxiliary securing means. On the contrary, the spacing means are formed integrally with means for securing the members thereto simply by the application of pressure to each side of the architectural shape. Such pressure can be applied during the fabrication of the shape by compressing between plates of similar size, or, alternatively, a shape can be compressed between rollers or platens, with one or more passes, depending upon the materials utilized therein. The spacing and securing elements are further arranged when joined to the members in this fashion to determine precisely the width of the space to be enclosed therebetween and the penetration of the elements therein, without the use of additional hardware for this purpose. My novel architectural shapes, therefore, can be formed quickly and easily without the use of glue or settable material or other auxiliary securing means, and moreover, can be maintained within close tolerances of overall shape thickness.

When thus secured the architectural shapes and the spacing and securing elements thereof are highly resistant to separatory, bending and shearing forces that may be applied respectively to the members, owing to the configuration thereof, and to the employment of my novel spacing elements with their integrally formed securing means.

Alternative embodiments of my spacing elements can be provided with thermal insulating means or associated with sound deadening means, according to the teachings of the invention.

Various materials can be employed in the construction of the architectural shapes, for example, hard and soft woods, hard and soft fiber boards such as Masonite (untempered, treated or tempered), flake board, Celotex and Homasote or other wood-fiber board, fire-proof material such as asbestos fiber board, composite materials such as gypsum, plaster board or metal backed with a softer material, and in certain applications, relatively soft, nonfibrous materials such as sheet aluminum. It is also contemplated that panel members of differing materials can be joined together, for example, a simulated panel plywood can be joined to plaster board, where different finish materials are required for adjacent rooms separated by a partition constructed from the architectural shapes of my invention. In such cases it is contemplated that the spacing elements of my invention be provided with integrally formed but appropriately differing securance means, with each being adapted for use with the particular type and hardness of the member to be affixed thereto.

The architectural shapes disclosed herein can be formed from a pair of spaced, suitably shaped members, or, alternatively, three or more such members can be joined in spaced relation. In any event, the securance of the spacing element or elements thereof to the two of more members can be effected simultaneously, solely by the application of pressure. No gluing or other securance means or hardware is required for rigidly joining the shape members. The number of members utilized will, of course, depend upon a given application of the architectural shape, for example, the thickness and strength of the wall member or other panel, beam, joist, stud or the like to be formed therefrom and particularly whether the architectural shape is a bearing member and the direction of actual or potential loading. Owing to the strength of the architectural shapes disclosed herein, the space between individual members of the architectural shape can be varied considerably depending again upon the aforementioned conditions including beam loading and further upon the desired heat and/or sound insulating qualities.

Finally, it is considered that the spacing elements can be made in a variety of configurations, for example, oval, circular, spiral, and either parallel or opposed serpentine (when more than one spacer is used). In the latter case, the spacing elements can be spot welded or otherwise secured together at the peaks of their undulations for additional strength and to permit handling of the spacing members simultaneously.

In general, it is desirable for optimum strength of the shape to use spacing elements of continuously curving configuration and to avoid the use of unidirectional runs or portions therein. A single or continuous serpentine spacer can be employed to advantage in architectural shapes such as beams or studs. In this case the serpentine member is undulated over a substantial proportion of the width of the strips so joined for a maximum skin stressing effect.

In the article aspect of my invention, I accomplish these desirable results by providing an architectural shape comprising a pair of spaced shape members, at least one spacing element extending therebetween, the lateral edges of said spacing element each having a serrated configuration embedded respectively in the adjacent one of said members, and at least some of the teeth of said serrated configurations being disposed at an angle to the continuum of said spacing element in order to increase the frictional engagement of said embedded configurations with said members.

I also desirably provide a similar architectural shape characterized in that adjacent teeth are set at opposite angles respectively to said spcing element.

I also desirably provide a similar architectural shape characterized in that said members are fabricated from materials of substantially different hardnesses respectively and that said set angles are larger in the serrated configuration embedded in the softer member.

I also desirably provide a similar architectural shape wherein a number of the teeth of said serrated configurations are disposed in the continuum of said spacing element to prevent lateral slippage of said spacing element when said teeth are embedded.

I also desirably provide a similar architectural shape wherein the members of said shape are provided with lateral joining means for joining said shape to similar shapes having similar and co-operating lateral joining means.

I also desirably provide a similar architectural shape wherein said shape is provided in the form of a beam, and said members are elongated co-extensive strips capable of being skin stressed, and said spacing element extends substantially along the length of said strips and substantially across the width thereof.

I also desirably provide a similar architectural shape wherein thermal or sound insulating means are positioned in the space between said members.

Further in accord with the article aspect of my invention I provide a spacing element for use in spacing and securing members of an architectural shape, said spacing element comprising an elongated strip of structural material, the lateral edges of said spacing element being serrated for embedment in the adjacent surfaces respectively of said members at least some of the teeth of said serrations being set at an angle to the continuum of said spacing element.

I provide a similar spacing element wherein a number of the teeth of said serrations are extended in the continuum of said spacing element for guiding purposes.

In the method aspect of my invention I provide a method of assembling an architectural shape, said method comprising the steps in variable order of spacing a pair of members in substantially parallel array, inserting in said space at least one spacing element having embedable serrations along its opposite lateral edges respectively, and compressing said shape by the application of opposing forces to the outer surface respectively of said members to embed and spread said serrations within the adjacent inner surface portions thereof.

I also provide a method for making a spacing element for spacing and joining members of a architectural shape, said method comprising the steps of cutting an elongated strip of structural sheet metal, serrating the lateral edges thereof, setting adjacent teeth of said serrations at opposite set angles, and varying the angle of said set substantially in direct proportion to the hardness of said members respectively.

It is contemplated that the teeth of the spacing element be set in opposition to one another such that the opposed teeth will further spread upon being embedded into the material of the associated shape member, when the shape members are assembled as noted previously, to increase further the resistance of the architectural shape to separatory forces and to define precisely the limit of penetration of the spacing member into the adjacent panel member at either lateral edge of the spacing member.

As noted above the angle of set of the serrated edges will vary depending upon the hardness of material from which the shape members are fabricated and, generally speaking, smaller angles of set are utilized for harder materials. By the same token the peak or apex angle of the teeth varies with the hardness of the material. In the latter case, however, the apex angle increases with hardness of material. The angle of set or incidence and the angle of the apex must be adjusted also according to the speed at which the teeth are embedded into the material of the panel members. For example, if the architectural panel is passed between rollers, for the application of pressure thereto, one pass will usually be sufficient if the angle of incidence or set of the teeth is near the optimum. In any event, the pressure applied to the architectural shape tends to further spread the teeth of the serrated edges of the spacing members as the teeth are embedded into the material of the shape members. This serves to affix the shape members more securely to the spacers and to prevent the spacers from becoming embedded in the shape members beyond the roots of their teeth. Thus the shape members are equidistantly spaced throughout the space enclosed therebetween, and, most importantly, the spacing of the shape members can be controlled within reasonably close tolerances.

These and other objects, features and advantages of the invention will be elaborated upon during the forthcoming description of certain presently preferred embodiments of the invention together with preferred methods of practicing the same.

In the accompanying drawings I have illustrated certain presently preferred modifications of the invention and have shown certain preferred methods of practicing the same, wherein.

FGI. 14 is a partial, cross-sectional view of an architectural shape of the invention and illustrating one method assembly thereof.

Figures 1, 2:
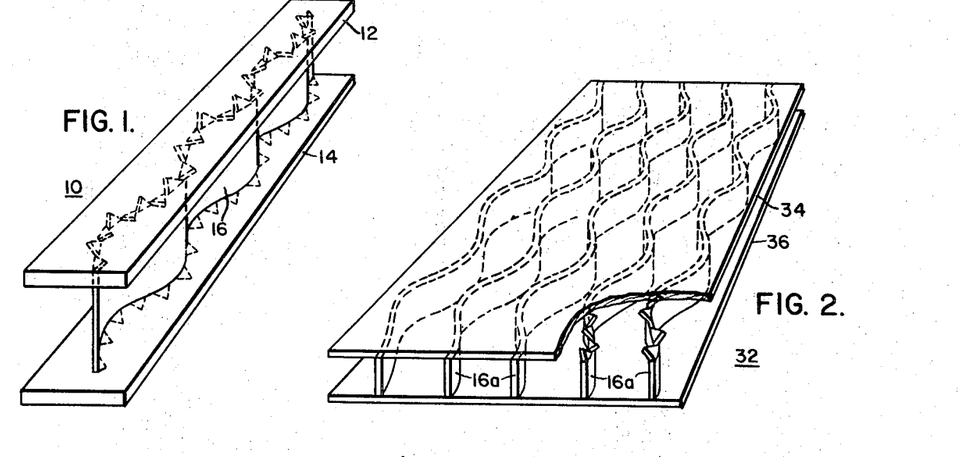
FIG. 1 is an isometric view illustrating an architectural shape of simple form comprising the structural elements incorporating the teachings of the invention.
FIG. 2 is an isometric view of another form of architectural shape or wall structure made in accordance with the invention.

Referring now to FIG. 1 of the drawings, an architectural shape in the form of a beam, indicated generally by the reference character 10, is illustrated and includes a pair of spaced skin-stressable members 12 and 14 joined by a spacing member 16, in this example of serpentine configuration. It will be seen that the spacing member 16 presents a continuously curving surface for optimum columnar strength in order to afford maximum resistance to shearing forces applied respectively to the panel members 12 and 14.

Figures 3, 4:
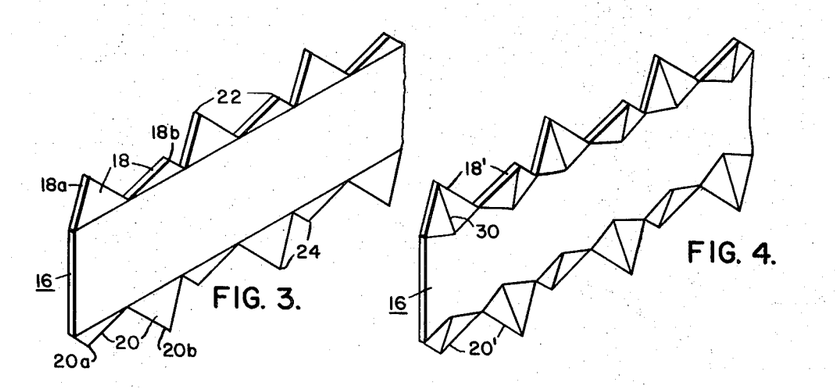
FIG. 3 is a perspective view of an exemplary form or spacing member which can be utilized with the architectural shapes disclosed herein.
FIG. 4 is an isometric view of another form of the spacing member of the invention, illustrating the use of teeth reenforcing means.
Figure 5:
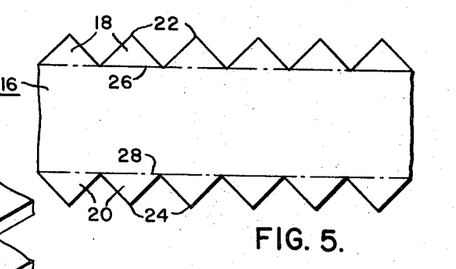
FIG. 5 is a side elevational view of the joining member shown in FIG. 3.

As better shown in FIGS. 3 and 5 the spacing member 16 is serrated along its upper and lower lateral edges as viewed in the drawings in order to produce a series of teeth 18 and 20 which are embedded respectively in the panel members 12 and 14 during the assembly process of the invention. The spacing member 16 desirably is fabricated from a suitable structural material of requisite strength and toughness, which are largely dependent upon the material comprising the beam members 12 and 14, and upon economic considerations. For most applications the spacing member 16 can be fabricated from carbon steel which can, if desired, be zinc coated or tin plated or the like for use in those areas where moisture may be encountered.

At least some of the teeth 18 and 20 are disposed at an angle, or set, relative to the plane of the adjacent portion of the joining member 16 in order considerably to increase the frictional engagement thereof with the beam members 12 and 14 respectively. Adjacent pairs of the teeth, for example 18a, 18b, 20a, 20b, are set in this arrangement, to approximately the same angle but in opposite directions relative to the plane of the immediate area of the spacing member 16. This arrangement affords a maximum of frictional engagement of the spacer 16 with the beam members 12 and 14, with the set or angle of incidence of the teeth 18 and 20 being varied relative to the panel members 12 and 14 depending upon the given materials, from which the members 12 and 14 are fabricated. As pointed out hereinafter, the material of the beam member 12 can be different from that of the panel member 14 depending upon the application of the invention and the direction of load application. The angle of incidence or set of the teeth 18 may be different from that of the teeth 20, depending upon the hardness of such materials. As a general rule, the angle of incidence of the teeth 18 or 20 will vary inversely with the hardness of the materials, comprising the members 12 or 14, engaged thereby. The spacing member 16 also can be provided with a different height (see FIG. 20 and 20A, infra) depending upon beam loading.

By the same token the peak or apex angles 22 and 24 of the teeth 18 and 20 respectively will be varied, depending upon the hardness of the materials comprising the members 12 and 14. In this case, however, the angles 22 and 24, which can be different depending on material hardness of the respectively associated panels, will vary directly with the hardness of the materials engaged thereby. That is to say broader teeth having larger apex angles desirably are used with the harder materials in order to provide the teeth with greater strength for penetration therein.

Notwithstanding the particular apex and set angles utilized, however, the teeth 18 or 20 will tend to spread still farther, when provided with set angles in accordance with this feature of the invention, to enhance further the frictional engagement of the teeth 18 and 20 with the panel members 12 and 14 respectively. Moreover, the angular disposition of the teeth and particularly the increased spread therebetween when embedded, limits the penetration of the spacing member 16 into the joined members 12 and 14 precisely to the roots of the teeth 18 and 20 respectively as denoted by the chain lines 26 and 28 of FIG. 5. Thus, the distance between the chain lines 26 and 28 determines precisely the spacing between the members 12 and 14 when the beam or other shape 10 is assembled in accordance with the invention, and thus the space enclosed between the members 12 and 14 is reliably equidistant throughout the area of the architectural shape 10. Therefore, the use of the angularly disposed teeth of the invention provides additional control over the total width of the beam 10 as compared to use of teeth 18 and 20 in their flat and planar disposition relative to the spacing member 16.

Figures 4A, 17, 18, 19:
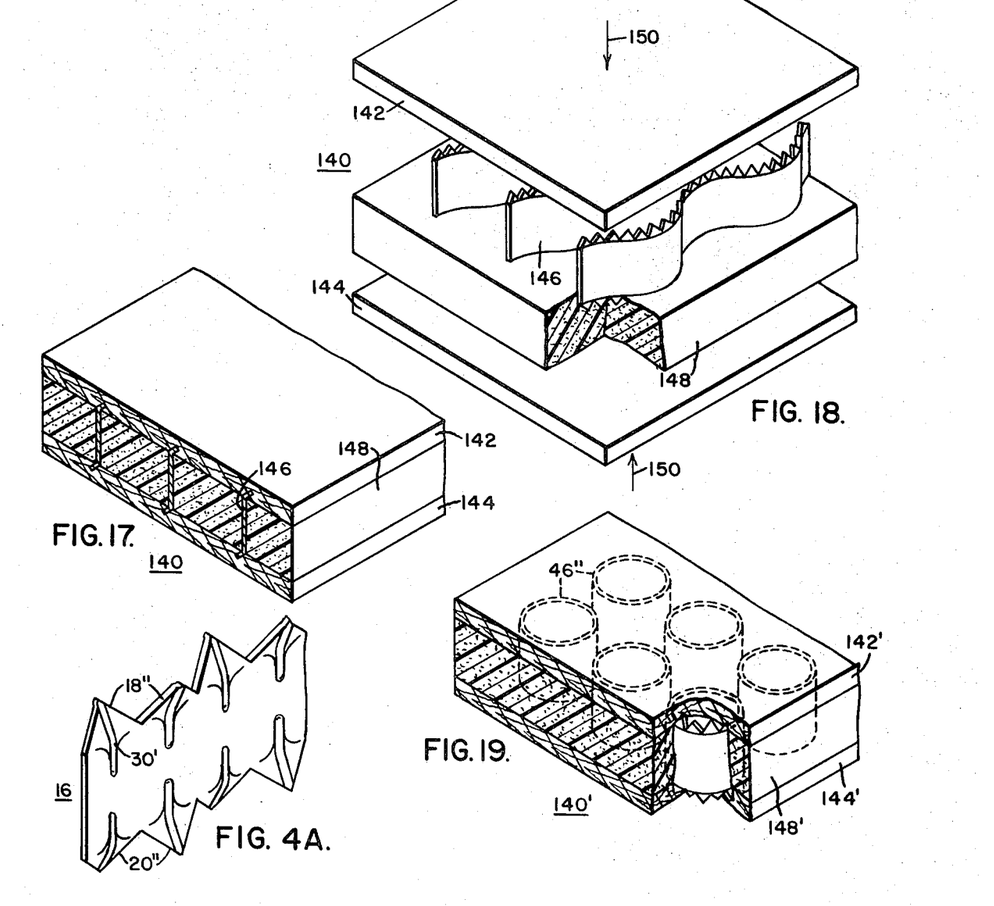
FIG. 4A is an isometric view of a spacing member provided with modified reenforcing means.
FIG. 17 is an isometric view of still another arrangement of the reinforced architectural shape of the invention, with portions thereof being broken away to show the invention more clearly.
FIG. 18 is an exploded view of the shape illustrated in FIG. 17 and showing certain steps in the fabrication thereof.
FIG. 19 is an isometric view, partially broken away, of an architectural shape similar to that shown in FIGS. 17 and 18, but illustrating a modified spacing member arrangement.

In order to increase further the strength of the individual teeth, the teeth 18 or 20 or both can be provided with a shallow trough or V-shaped configuration extending along the vertical axes 30 of the teeth, as viewed in FIG. 4 of the drawings, or with a central, vertically extending rib or groove 30' as shown in FIG. 4A. Desirably the trough 30 or groove 30' extends across the root or fold line of the associated teeth and into the base portion of the spacing member 16. Such trough shape in effect performs the function of a reinforcing rib or the like disposed generally along the vertical axis of the teeth 18' or 20' of FIG. 4.

Referring now of FIG. 2 of the drawings, an architectural shape, such as panel 32 which would be used, for example, for a door or for constructing partitions or the like, includes upper and lower panel members 34 and 36 which are secured and spaced by a plurality of spacing members 16a. The latter members are joined to the panel members 34 and 36 in the manner described above in connection with FIGS. 1 and 3–5 of the drawings. In this arrangement of the invention a plurality of the spacing members 16a are arranged generally in parallel spaced array such that the array is co-extensive with the adjacent areas of the panel members 34 and 36. The serpentine configuration of the spacing members 16a lends columnar or shear strength to the architectural panel 32, as noted above in connection with FIG. 1 of the drawings.

FIGS. 6–9 of the drawings illustrate generally similar architectural shapes or panels, 38, 40, 42 and 44, respectively, in which the panel members thereof are joined in spaced relation by spacing members 46, 46', 16b and 48, respectively. As evident from the drawings, the various shapes of the spacing members are continuously curving to provide the optimum of columnar support for the associated architectural panel.

Figure 6:
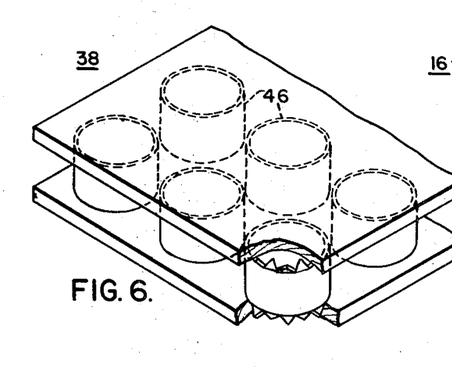
FIGS. 6–9 inclusive are each an isometric view, partially broken away, of an architectural shape arranged in accordance with the invention with a different configuration of spacing means.

For example, in FIG. 6 of the drawings, the spacing members 46 are of annular confiuration disposed in a regular spaced array. Although the spacing members 46 are shown as circular in FIG. 6, it is to be understood that any of various oval or elliptical configurations can be utilized.

Figures 7, 8, 9, 10, 11, 12, 13:
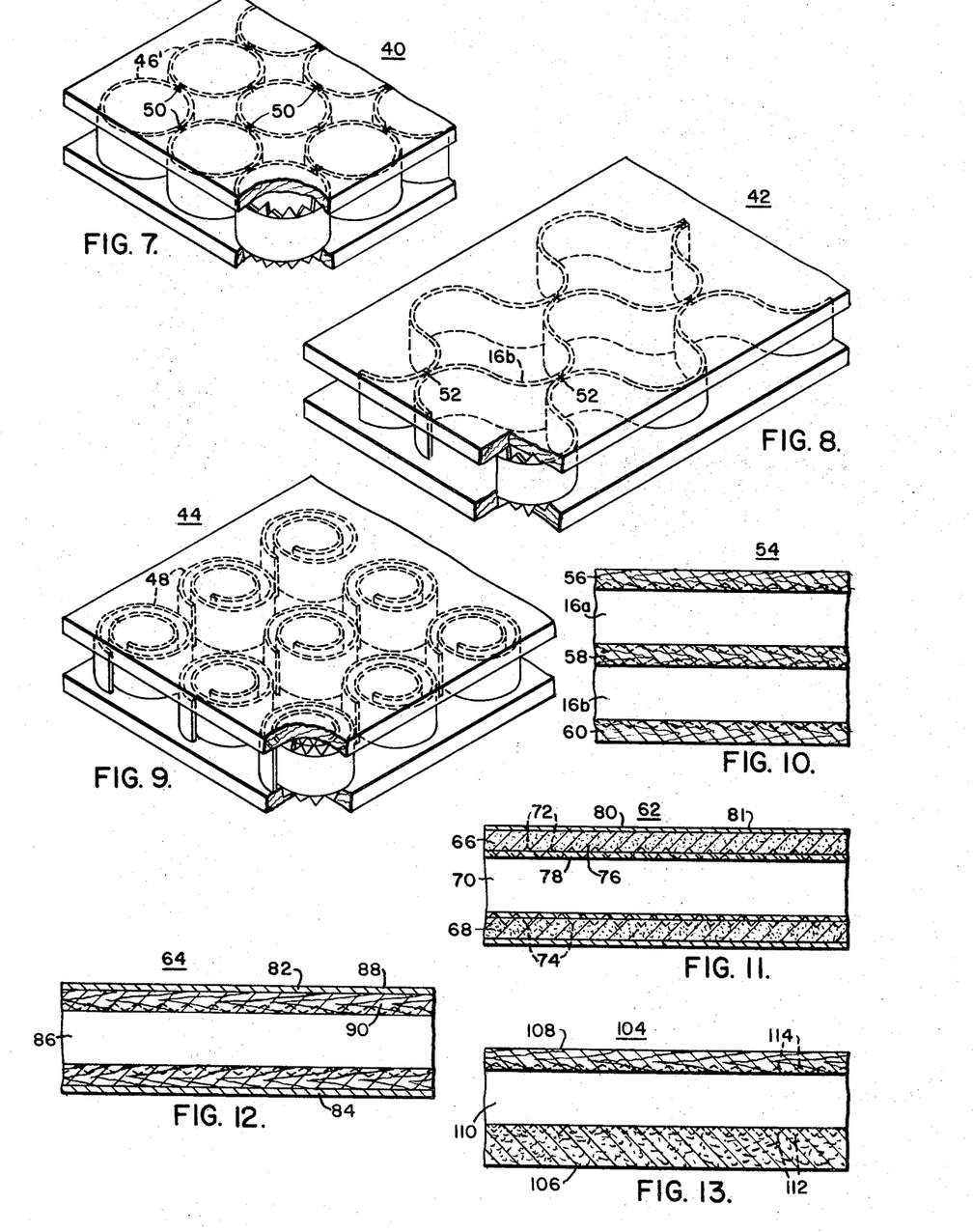
FIG. 10 is a partial, cross-sectional view of another form of an architectural shape illustrating the use of three or more spaced panel members.
FIG. 11 is a partial, cross-sectional view of another form of architectural shape arranged in accordance with the invention and illustrating the use of composite panel members such as paper-backed gypsum board.
FIG. 12 is a partial, cross-sectional view of another form of architectural shape of the invention and illustrating the use of composite panel members such as metal-backed wood panels.
FIG. 13 is a partial, cross-sectional view of still another form of the architectural shape of the invention and illustrating the use of spaced panel members of different materials.

In the arrangement of FIG. 7, the spacing members 46', which can be shaped as noted in connection with FIG. 6, are arranged in a closely spaced array and the points of junction therebetween can be secured by spot welding or the like, as denoted by reference characters 50, to facilitate handling of the array of spacing members and to lend additional strength to the architectural panel 40.

The architectural shape 42, as illustrated in FIG. 8, is generally similar to the panel 32 of FIG. 2, with the exception that the serpentine spacing members 16b are displaced longitudinally the distance of one-half undulation such that the peaks of their undulations are engaged. For added strength and ease in handling, the array of spacing members 16b for each panel 42 can likewise be joined by spot welds 52 or the like at the points of their engagement.

In FIG. 9 of the drawings the spacing members 48 are formed as discrete, closely spaced spiral members in order to provide increased columnar support to the architectural panel 44.

In those applications where the heat insulational characteristics of the panel are to be employed to greatest advantage, it will be noted that the spacing member arrangements of FIGS. 8–10 inclusive, whether permanently joined or merely in closely spaced array, will prevent the flow of air in any direction through the panels 42–44. Insulating means for the spacers themselves are described below in connection with FIGS. 25 and 26.

Referring now to FIG. 10 of the drawings, a multi-layered architectural shape such as panel 54 is illustrated wherein three or more panel members 56, 58, 60 are maintained in spaced relation by similarly spaced arrays of the aforedescribed spacing members, for example, the spacing members 16a and 16b. While three such panel members are shown in FIG. 10, it will be understood that the panel can include a greater number of such panel members alternating with a requisite number of arrays of the spacing members. Moreover, the spacing members 16a can be of greater height, as viewed in FIG. 10, than that of the spacing members 16b, and vice versa, to space one of the outer panel members 56, 60 at a greater distance from the inner panel 58 than the other outer panel. Moreover, for exemplary purposes the lateral serrations or teeth associated with each array of the spacing members 16a can be embedded in the adjacent surfaces of the panels 56–60 by a single application of compressive forces as described below in connection with FIG. 14 or by one or more passes between suitable rolls or platens as noted below with reference to FIG. 15. In the assmbly of the panel 54 of FIG. 10, considerable compressive force can be applied thereto to ensure complete embedding of the various teeth associated with the spacing member 16a within the adjacent surfaces of the panel members, owing to the set or angles of incidence imparted to the spacing member teeth.

The architectural panel 54 is particularly useful for exterior walls particularly curtain walls and the like requiring greater thickness for enhanced strength or insulational characteristics, and for this purpose the outer panel members 56 and 60 can be fabricated from differing finish materials as required by the exterior and interior finish requirements relative to the building in which the panel 54 is thus used. On the other hand, the inner panel member 58 can be fabricated from a relatively cheap material, such as fir plywood.

The architectural shape or panel of FIG. 10 is also useful in those applications where considerable weight is applied thereto as where the panel is used as part of floor or roof structures or in interior or exterior bearing walls to which considerable weight is applied. When used in interior bearing partitions it is contemplated that one of the outer panel members 56 or 60 can be fabricated from a simulated wood paneling material while the other of the outer panels can be fabricated as a plaster or gypsum board or the like in order to provide, for example, differing interior finishes in adjacent rooms separated by the bearing partition. In the latter case, the inner panel member or members 58 can be fabricated from a relatively inexpensive material as noted above. In like manner the panels illustrated in the preceding figures can be provided with panel members fabricated from the same or differing finish or structural materials. In any event, the teeth associated with the upper spacing members 16a or with the lower spacing members 16b can be provided with a differing apex and set angles to adapt the upper and lower teeth of each array of spacing members 16a or 16b or both for joining to differing materials.

Referring generally to FIGS. 11 and 12 of the drawings, it will be seen that the architectural shapes 62 and 64 thereof can be formed from composite panel members or the like. For example, in FIG. 11, the panel members 66 and 68 are fabricated from paper backed gypsum board, known conventionally as plaster board or sheet rock. The spacing elements 70 therebetween, which can take the form of any of the spacing members noted above are provided with teeth of relatively wide angles of incidence and of intermediate apex angles such that the teeth 72 and 74 do not penetrate far into the gypsum material 76 of the panel members 66 and 68, but rather are further set by the density of the gypsum material to lie more or less immediately behind the paper backing 78 of each panel member 66, 68. This arrangement firmly secures the panel members 66, 68 to the spacing members 70 as a result of the great many teeth 72, 74 involved but does not permit the teeth to extend toward the outer surfaces 80 of the plaster board where the teeth may otherwise produce cracks or bulges in the finish paper covering 81 usually provided on the plaster board.

With reference to FIG. 12, one arrangement for joining metallic panel members 82 and 84 through the use of spacing members 86 arranged in accordance with the invention, is illustrated. In this example, the panel members 82 and 84 are composite materials, including a metallic finish layer 88 and a suitable preferably softer backing layer 90 of wood or the like adhered thereto. The spacing members 86 are provided with lateral serrations in the manner described before which are embedded within the softer material 90 of each of the panel members 82 and 84. With this arrangement the metallic layers 88 can be fabricated of any suitable metallic material regardless of its hardness relative to that of the spacing members 86.

Figure 16:
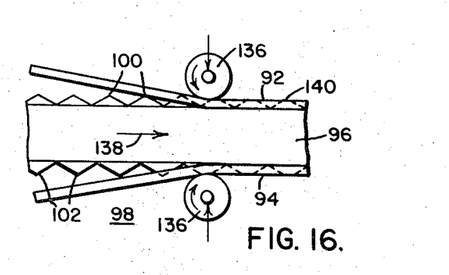
FIG. 16 is a partial, cross-sectional view of an architectural shape arranged in accordance with the invention and illustrating still another method of assembly thereof.

As shown in FIG. 16 of the drawings, two or more metallic panel members 92 and 94 can be joined directly to serrated spacing members 96 to form a completely metallic architectural shape or panel denoted by reference character 98. In this arrangement of the invention the panel member 92 and 94 are fabricated from a relatively softer metal such as aluminum while the spacing members 96 are fabricated from carbon steel, which can be suitably hardened as required by the hardness of the panel members 92, 94. For the same purpose, teeth 100 and 102 of the spacing members 96 preferably are reinforced as described above in connection with FIG. 4 of the drawings or equivalent.

As better shown in FIG. 13 of the drawings an architectural panel 104 arranged in accordance with the invention can be fabricated from panel members 106 and 108 of differing structural or finish materials and joined as described above by spacing members 110. For example, for usage of the panel 104 in outer, brick-veneered wall structures the outer panel member 106 can be fabricated from Celotex or similar fibrous material providing the desired insulational characteristics while the inner panel members 108 can be fabricated from a panel type plywood or other suitable finish material. If desired an intermediate panel or panels (not shown) can be added to the architectural panel 104, as described above in connection with FIG. 10 of the drawing. With this arrangement of the invention, the usual studding utilized in veneered construction and the separate additions thereto of insulating and finish materials are eliminated.

The spacing members 110 of FIG. 13 are provided at their outer lateral edges with teeth 112 having relatively large set angles but with relatively narrow peak or apex angles in order to ensure that the narrower teeth 112 are further set as they are embedded in the relatively soft fibrous material 106 during assembly of the panel 104. On the other hand the teeth 114 at the inward lateral edges of joining members 110 are provided with relatively small set angles and with intermediate to large angles for proper embedment in the plywood panel 108, depending upon the hardness thereof. The wider teeth at the wooden or other harder surfaces of course, have greater strength.

Figure 14:
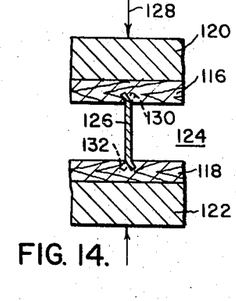
Figure 15:
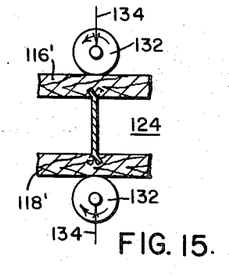
FIG. 15 is a partial, cross-sectional view of an architectural shape of the invention and illustrating another method of assembly thereof.

With reference now to the assembly methods as illustrated in FIGS. 14–16 of the drawings, various means are illustrated for the application of assembly pressures to the outer surfaces of the outermost shape members of a given architectural shape of the invention. In FIG. 14 panel members 116 and 118 are respectively engaged at their outer surfaces by a pair of pressure plates 120 and 122 which are preferably coextensive with the area of the panel 124. After assembly of the panel 124 with the spacing members 126 inserted therebetween pressure is applied uniformly over the panel members 116, 118 by the pressure plates 120, 122 as denoted by arrows 128 to embed and to endow the teeth 130 and 132 respectively with a further set in the panel members 116 and 118.

In FIG. 15 of the drawings, the architectural shape 124' is similarly assembled by passage between a pair of opposed rollers 132 which are urged against the outer surfaces of the shape members 116' and 118' as denoted by arrows 134. In the latter arrangement of the invention, however, the panel 124' is passed one or more times between the rollers 132, depending upon the hardness of the panel members 116', 118' and the attendant sets of the spacing member teeth. For example, if the panel members 116', 118' are fabricated from Celotex, Homasote, or other relatively soft fibrous material, the teeth 130', 132' can usually be embedded in a single pass between the rollers 132. On the other hand, for relatively hard, inflexible panel members, such as the hardwoods or Masonite, a number of passes must be used such as 2–4 passes for Masonite.

Referring now to FIG. 16 of the drawings, the all metal panel 98 thereof, described previously, is assembled by insertion between a pair of rollers 136 with the panel 98 moving relatively in the direction indicated by arrow 138. Owing to the relative thinness of the panel members 92 and 94 the teeth 100, 102 of the spacing members 96 will protrude therethrough when the plate is assembled. However, the flexibility of the metallic panel members 92, 94 enables the architectural panel 98 to be assembled in one pass between the rollers 136, which protrudes the teeth 100, 102 through the respective panel members and at the same time, owing to the set thereof, deflects and clinches the protruding portions of the teeth, as denoted by reference characters 140, against the outer surfaces of the panel members to further secure the spacing member 96 thereto. The architectural shape of FIG. 16 is useful only in those applications wherein an uninterrupted surface finish of the outer portions of the architectural shape is not important.

Referring now to FIGS. 17 and 18 of the drawings, an architectural shape or panel 140 is disclosed wherein the thermal insulational qualities thereof are enhanced, particularly in those constructions where the spacing members are arranged such as in FIGS. 1, 2 or 6, so as otherwise to permit the circulation of air throughout the panel or other shape. In this arrangement of the invention the panel 140 includes a pair of panel members 142 and 144 spacedly joined by a number of spacing members 146. The spacing members 146 desirably are of continuously curving configuration, such as one of the several forms of spacing members described in connection with the preceding figures. In this example the spacing members 146 are of serpentine configuration as seen more clearly in FIG. 18. The panels 142 and 144 likewise can be constructed or fabricated from any of the aforementioned materials or from differing materials depending upon use of the panel 140.

One arrangement for thus enhancing the inherently insulating characteristic of the panel 140 includes filling the entire space between the panel members 142, 144 and around the spacing members 146, with a good, thermally insulating matrial. One arrangement for accomplishing this includes the use of a foamed insulating board 148 which desirably is sufficiently rigid to permit cutting thereof without appreciable deformation of the foamed board. Examples of materials from which the foamed board 148 can be fabricated are Styrofoam, which is a foamed polystyrene plastic, and polyurethane foamed board. The foamed board 148 desirably is made coextensive with the panel members 142 and 144.

When assembling the architectural panel 140 a number of the spacing members 146 are laid on edge in a predetermined array, upon the upper surface of the foamed board as better shown in FIG. 18 of the drawings. The foamed board 148 itself is placed upon the lower panel member 144 and the upper panel member 142 is placed upon the adjacent upper lateral edges of the spacing members 146. Pressure is then uniformly applied to the outer surfaces of the panel members 142, 144 as denoted by arrows 150. Desirably, such pressure is applied as set forth above in connection with FIG. 14 of the drawings.

A relatively light application of pressure causes the spacing members 146 to slice downwardly through the relatively rigid, foamed insulation 148 until the lower teeth of each spacing member come to rest against the upper surface of the lower panel member 144. At this point the application of pressure to the panel members 142, 146 is continued, and increased where required by the hardness of the panel members 142 and 144, to cause the lateral teeth of each spacing member 146 to embed respectively into the adjacent inward surfaces of the panel members 142, 144 as set forth above in connection with the preceding figures of the drawings.

If desired, the spacing members 146 can be terminated short of the ends of the panel members 142, 144 and the foamed board 148 in order to avoid complete severing of the foamed board. On the other hand, the embedment of the spacing members in the panel members 142, 144 under pressure operates to retain the panel members in clamping engagement with the foamed board 148 to prevent removal thereof particularly in those applications wherein it is intended to completely sever the foamed board 148 by the slicing action of the spacing members 146.

Alternatively, as shown in FIG. 19, a spacer arrangement similar to that of FIG. 6 can be employed to advantage in order to avoid elongated cuts in the foamed board 148'. In this form of the invention, the spacing members are provided in the form of circular or oval members 46" arranged in a spaced array between the panel members 142', 144' and serving additionally to retain the foamed board 148' between the panel members 142', 144' inasmuch as the spacing members 46" do not extend to the lateral edges thereof and do not contact one another.

In any event, no glue is necessary to secure the foamed board 148 or 148' to the panel members forming part of the architectural panel 140 or 140', owing to the clamping action of the panel members or to the retaining action of the spacing members, or both. Moreover, the panels 140 and 140' can be assembled quickly and easily with what is essentially one fabricational step.

In the following table, illustrative set angles and apex angles for use with the aforedescribed serrated spacing members are given for the various materials joined thereby:

| Material | Set angle, deg. | Apex angle, deg. | Spacing member material |
|---|---|---|---|
| Soft steel | 5 | 120 | Tempered carbon steel. |
| Aluminum | 5 | 120 | Do. |
| Masonite and hardest woods | 5 | 100 | Black plate or cold-rolled carbon steel. |
| Soft woods | 7–10 | 90 | Soft steel. |
| Gypsum plaster board | 20–25 | 80 | Do. |
| Homasote, Celotex | 20–30 | 30–45 | Soft steel, aluminum, or aluminum alloys. |

It is to be understood, however, that the foregoing table is presented primarily as a guide for the use of certain spacing member materials with certain panel member materials. Other materials can be utilized which may or may not correspond precisely with the combinations shown in the foregoing table; however, the various angles of the spacing members can be readily deduced from the table. It will also be obivous that the angle of the set and apex angle of the teeth will therefore be varied to suit the particular materials utilized for the spacing members and for the panel members and also to the forces applied to the panel members during assembly of the architectural panel in accordance with the invention, the magnitude of which forces will determine the speed at which the teeth are embedded in the panel members. For very hard materials the teeth of the various spacing members disclosed herein can be reinforced as described below.

Figures 20, 20A, 21A:
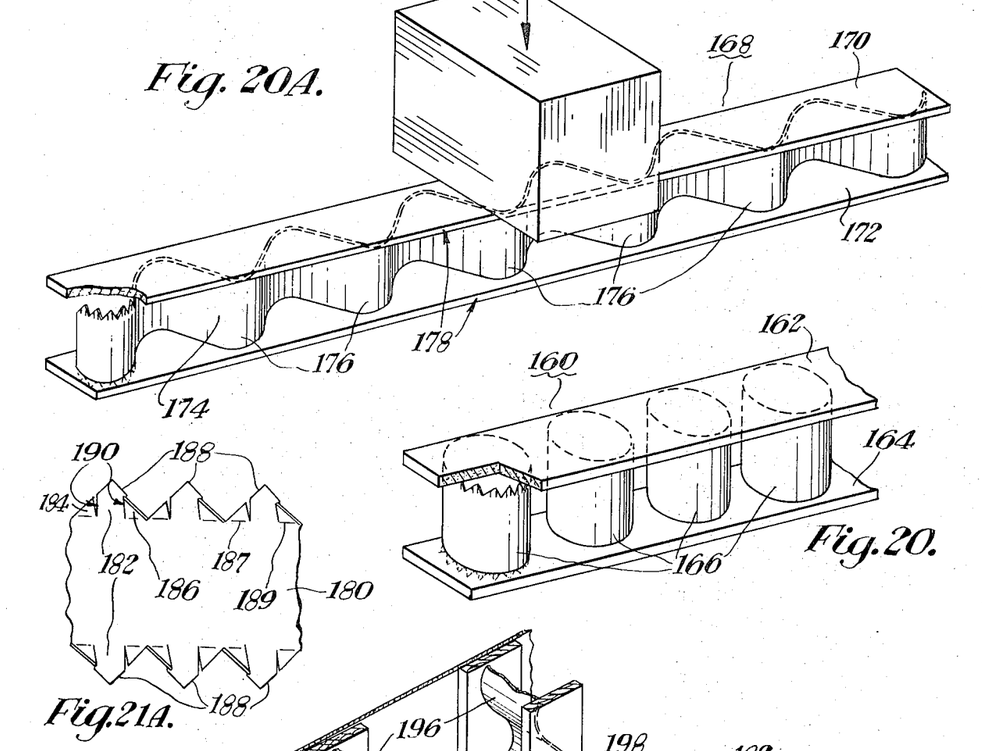
FIG. 20 is an isometric view of another form of architectural shape similar to FIG. 1 and arranged in accordance with the invention.
FIG. 20A is an isometric view of a modified form of the architectural shape shown in FIG. 20.
FIG. 21A is a partial elevational view of the spacing member shown in FIG. 21.

Referring now to FIG. 20 of the drawings, the architectural shape therein is arranged in the form of a beam 160 fabricated in this example from inexpensive material such as structural lumber including a pair of 2″ x 4″s 162, 164. In this example the beam members are spacedly secured by a longitudinal row of circular spacers 166. Depending upon the loading to which the beam 160 is subjected, the circular spacers 166 can be provided with teeth along their lateral edges as described heretofore, particularly with reference to FIG. 7. Preferably, however, the circular spaces are provided with tripartite serrations described below with reference to FIGS. 21 and 21A, which have been found to afford a considerably enhanced securance characteristic particularly when the spacing elements are embedded in softer materials. For maximum securance the circular spacers are brought as near the lateral edges of the beam members, 162, 164, as consistent with proper embedment of their teeth.

When loads are applied to the beam 160, the beam becomes skin stressed, i.e. tensional loads are concentrated in the lower beam member 164 and compressive loads in the upper member 162, with the circular spacers serving merely to secure the beam members spacedly together. Thus, when the beam 160 is arranged in accordance with the invention, it is capable of very little deflection under loads, short of destructive loading. In this connection it has been found that the summation of securance forces between the circular spacers and the beam members 162, 164 are at least equivalent to the tensional and compressive stresses of the beam members themselves.

A similar beam arrangement 168 is shown in FIG. 20A of the drawings. In this example, thiner structural lumber is employed, for example, the boards or beam members 170, 172. The boards are separated relatively widely in this example by a single serpentine spacing element 174 similar to one of those shown in FIG. 8 of the drawings. The spacing element can be made from a suitable structural material such as sheet steel. Owing to undulation of the element substantially across the width of the members 170, 172, the width of the element 174 can be many times the thickness of the members 170, 172. The spacing member 174 likewise can be provided with the alternately set teeth as described above, but where greater loads are anticipated the spacing element 174 desirably is constructed in accordance with FIGS. 21 and 21A of the drawings.

It will be seen also that the spacing member 174 is provided with greater height in comparison to the height of the circular spacers 166 of FIG. 20. The particular height selected is dependent upon the anticipated loading, as the skin stressing effect increases with a greater height of spacing element, within the tensional or compressional strength of the boards 170, 172 or similar beam members. As pointed out with reference to the preceding figure the loadability of the beams 168 is increased by disposing the individual undulations 176 of the serpentine spacer 174 as close as possible to the lateral edges 178 of the boards 170, 172.

It will be appreciated of course that the beam structures of FIGS. 1, 20 and 20A can be used extensively in building construction where wooden beams such as lintels, joists, and rafters are conventionally used and in many cases where steel beams are used.

Figures 21, 22:
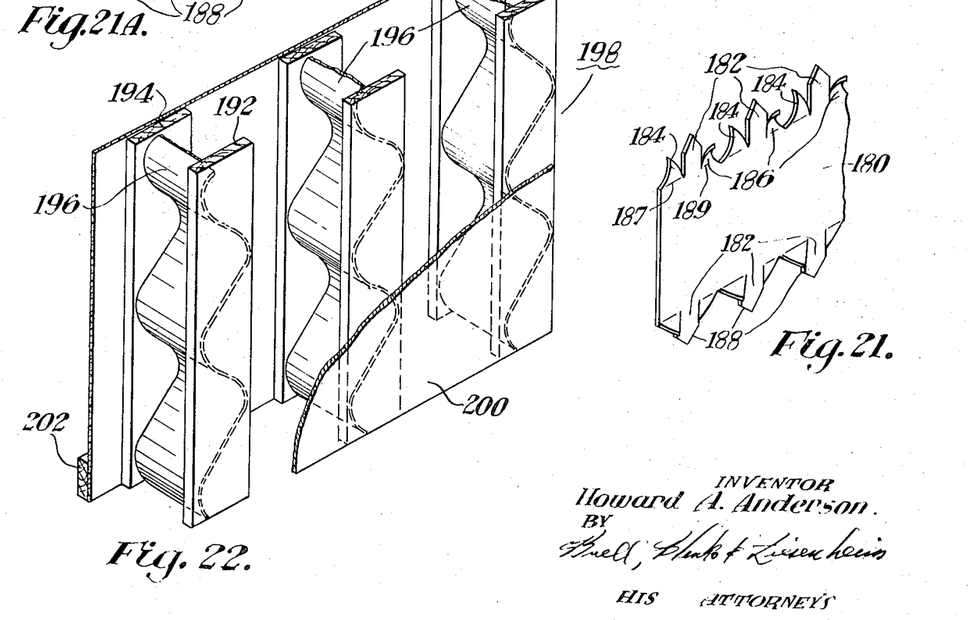
FIG. 21 is a partial isometric view of another form of spacing member which can be utilized with the architectural shapes disclosed herein.
FIG. 22 is a partial isometric view of a wall structure using another form of architectural shape arranged in accordance with my invention.

In FIGS. 21 and 21A of the drawings, a modified spacing element 180 is illustrated. The spacing element 180 can be provided in the form of a serpentine member (FIGS. 1, 2, 20A), a spiral member (FIG. 9), a circular (FIGS. 7 and 20) or other continuously curving member. The spacing element 180 is provided with means for preventing lateral slippage of the spacing member relative to the components of the architectural shape being joined thereby. It has been sometimes noted when assembling architectural shapes from softer materials that the spacing members will tend to slip or cant sidewise such that the set teeth on one side of the spacing member are embedded to a lesser extent than those on the other side causing less than maximum securance forces to be developed. Slippage results from the non-homogeniety of softer materials, such as wood, fiber board and gypsum board. In harder, more uniform materials such as aluminum, slippage of the spacing elements is less likely to occur, as all of the teeth will encounter substantially the same frictional forces in entering the material. While this factor is not critical in the case of large architectural shapes wherein relatively light or no loading perpendicular to the members being joined is anticipated, as in the case of door panels, it is important to attain maximum securance when the architectural shapes are employed as narrow shapes such as beams.

In furtherance of this purpose one arrangement of such guidance means includes a number of planar or upstanding teeth 182 disposed in the continuum of the spacing element, and interspersed among the oppositely set teeth 184 186 respectively. The guide teeth 182, when the architectural shape is assembled, are inserted perpendicularly into the material of the shape components and thus positively prevent lateral slippage of the spacing member180. In this example, one such guide tooth 182 is inserted between every other adjacent pair of oppositely set teeth 184, 186 as better shown in FIG. 21A.

The latter figure shows each pair of the set teeth 184, 186 and the guide tooth 182 therebetween comprising a single major tooth or serration denoted generally by reference character 188. In fabricating the spacing element 180 a series of the large or major serrations 188 are formed along the lateral edge portions of the spacing element. A pair of slits 190 is then made in each major serration 188 and the outer teeth 184, 186 formed in this manner are then set in different directions or at opposite angles to the continuum of the spacing element as apparent from FIG. 21. The central or guide tooth 182 of each major serration 188 is permitted to remain in the plane or more properly in the continuum of the spacing member 180 for the guidance feature mentioned above.

The roots 187, 189 of opposed set or outer teeth 184, 186 precisely limit the penetration of the spacing elements relative to the shape members joined thereby in the manner described previously with reference to FIGS. 3–5 of the drawings. These adjacent potrions, as in the case of similar teeth portions of the preceding figures, become flattened against the adjacent surfaces of the shape components so that further insertion of embedment of the spacing member is virtually impossible. Such flattening results from the relative thinness of the spacing member and its serrations, and the entry of the apices of the set or angled teeth at points divergent from the continuum or adjacent "plane" of the spacing member.

Architectural shapes, according to the invention, can also be arranged in the form of studs 190 as evident from FIG. 22 of the drawings. In this form of the invention a pair of relatively narrow strips 192, 194 of gypsum board, plywood, or the like are secured together by a serpentine spacing element 196. In this example the spacing element 196 is generally similar to that described above in connection with FIG. 20A of the drawings. However, the spacing element 196 is provided with a width and height consonant with the width of the strips 192, 194 and commensurate with the desired overall thickness of the studs 190.

A wall or partition 198 can be fabricated in the usual manner using my architectural shapes as studs 190 in place of the usual wooden studding. Thus, a panel 200 of gypsum board, plaster board, plywood or other constructional material can be secured to the studs 190 for example by gluing or by nailing in the usual manner. A panel of similar or different material can be secured to the other side of the studs 190 as desired. The finishing molding such as baseboard 202 can be similarly affixed to the outer surface of the panel 200 by gluing or by nailing at the studs 190.

The studs 190 when constructed in this manner, for example from strips of gypsum board and metal spacers, have the advantage of being virtually fire-proof. Other material can of course be employed in place of the gypsum strips, 192, 194, for example relatively thin strips of plywood. In the latter event there is still a considerable saving or elimination of wood in comparison to conventional wooden studding. Even where wood is used for the stud beams (FIG. 22), the serious problem of warpage, attendant upon conventional 2 x 4 wood studding is completely eliminated.

Figure 23:
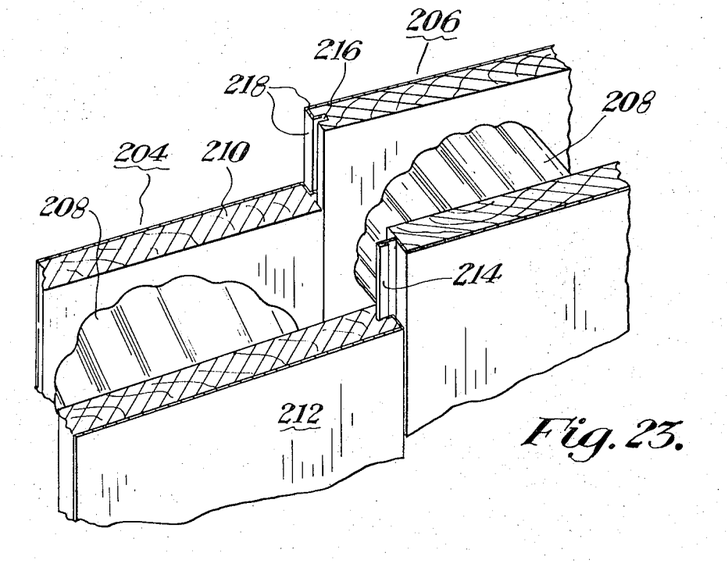
FIG. 23 is a partial isometric view of still another architectural shape having lateral joining means and arranged in accordance with my invention.

In FIG. 23 of the drawings means are illustrated for joining architectural shapes edgewise to form a continuous wall structure or the like. The panels 204, 206 thus joined can be fabricated in accordance with any one or more of FIGS. 2, 6, 7, 8, 9, or 12 for example and can be provided with spacing members 208 similar to that described in FIGS. 3, 4 or 21, depending upon the strength required. In this arrangement the panels 204, 206 are fabricated from a pair of shape components 209 each including a relatively thick, softer layer 210 of Homasote, Celotex or the like backed by an adhered sheet metal layer 212, which can be secured thereto by gluing or other conventional means.

The aforementioned lateral joining means are associated with the edges of the shape members 209 and in this example take the form of a tongue and groove construction 214–216. The tongue and grooves 214, 216 can be snapped together and include a lateral projection 214 formed from an appropriately bent overhanging edge portion of the metal backing 212 along one lateral edge of each panel member 209 and the re-entrant bending of the sheet metal 212 along the opposite lateral edge so as to extend into groove 216 formed in the lateral edge 218 of the Homasote or Celotex material 210. The interlocking panels 204, 206 for example, can otherwise be constructed as described previously in connection with FIG. 12 of the drawings. The spacing members 208 can take the form of any of the aforedescribed spacing members depending upon the application of the invention and the anticipated perpendicular loading to be applied to the panels 204, 206.

Figure 24:
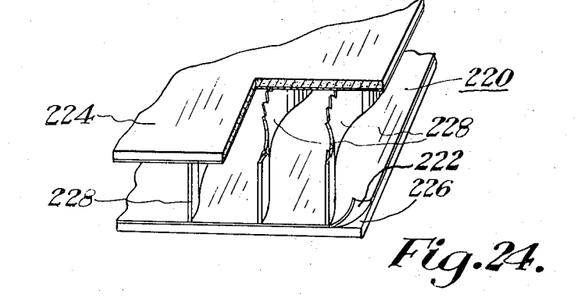
FIG. 24 is a partial isometric view of still another form of architectural shape having sound-deadening means incorporated therein.

FIG. 24 illustrates an architectural shape or portion thereof 220 provided with sound insulating or deadening means. The architectural shape 220 can otherwise be fabricated in accordance with any of the preceding examples of the invention. In this arrangement the architectural shape 220 is provided with a co-extensive sheet 222 of lead, or other relatively heavy material for sound insulating purposes, adjacent one or both of its spaced members 224 or 226. The architectural shape 220 is assembled by means of one or more spacing members 228 in the manner described above with the exception that the sound insulating sheet 222 is placed in position before assembly. In this example with the sheet 222 of a relatively soft metal or other material such as lead and with the spacing member 228 being fabricated from a relatively hard material such as soft steel the teeth of the spacing member 228 readily penetrate the sound insulating sheet 222 and become embedded into the panel member 224 or the like in the manner previously described.

In many applications wherein my novel architectural shapes are employed for exterior doors or partitions or in other applications of unequal temperature differences, it is desirable to prevent the transfer of heat between the spaced members of the architectural shape via the spacing elements secured therebetween. As the most desirable material of construction for the spacing members mentioned heretofore is mold steel the possibility of heat conduction through the spacing elements themselves is readily apparent when the shape is subjected to temperature differentials.

Figure 25:
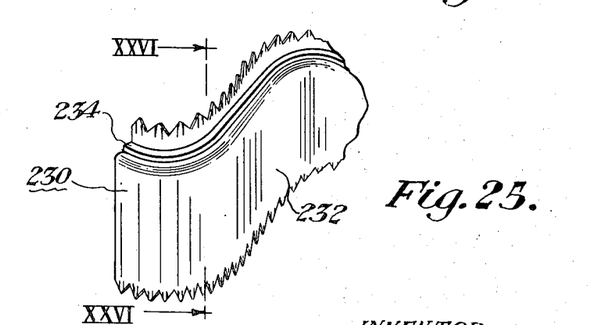
FIG. 25 is a partial isometric view of a self-insulating spacing member arranged in acordane with my invention for use with any of the architectural shapes disclosed herein.
Figure 26:
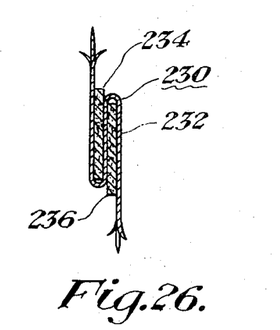
FIG. 26 is an enlarged cross-sectional view of the spacing member shown in FIG. 25 and taken along the reference line XXVI—XXVI thereof.

In FIGS. 25 and 26 of the drawings, a self-insulating spacer construction 230 is disclosed. Although the spacing element 230 is shown here as serpentine in form, obviously one of the other forms disclosed herein can be employed. As better shown in FIG. 26 the spacing member 230 desirably is twice folded back on itself to form a relatively wide central folded area 232. This fold 232 effectively lengthens the transverse path of heat transfer between the spaced members of the architectural shape. This longer path reduces the quantity of heat which can be transferred across a given one of the spacing members per unit time.

To prevent the individual folds of the central folded area 232 from touching one another, suitable insulating strips 234 and 236 are inserted therebetween. Depending upon the application of the invention, the insulating material can be fabricated from thin wooden strips, heavy cloth, asbestos sheet or the like.

In view of the foregoing it will be apparent that novel and efficient forms of architectural shapes have been disclosed herein. While I have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

I claim:

1. An architectural shape comprising a pair of spaced shape members, at least one spacing element extending therebetween, the lateral edges of said spacing element each having a serrated configuration embedded respectively in the adjacent one of said members, and at least some of the teeth of said serrated configurations being disposed at an angle to the continuum of said spacing element in order to increase the frictional engagement of said embedded configurations with said members, insulating means positioned in the space between said members, said insulating means include a sheet of relatively heavy metal disposed adjacent the inner surface of one of said members for sound insulating purposes, said sheet being penetrated and secured in place by the adjacent serrated configurations of said spacing element.

2. An architectural shape comprising a pair of spaced shape members, at least one spacing element extending therebetween, the lateral edges of said spacing element each having a serrated configuration embedded respectively in the adjacent one of said members, and at least some of the teeth of said serrated configurations being disposed at an angle to the continuum of said spacing element in order to increase the frictional engagement of said embedded configurations with said members, said spacing element being provided with a series of folds intermediately of its lateral serrations for thermal insulation purposes.

3. The combination according to claim 1 wherein insulating material is inserted between the layers of said folds to prevent direct contact therebetween.

References Cited

UNITED STATES PATENTS 2,120,049  6/1938  Winship ____________ 52—363

(Other references on following page)

UNITED STATES PATENTS

| | | | |
|---|---|---|---|
| 2,277,956 | 3/1942 | Coffman | 85—31 |
| 1,959,135 | 5/1934 | Miller | 52—376 |
| 826,125 | 7/1906 | Steinmetz | 287—20.92 |
| 1,025,799 | 5/1912 | Fulenwider. | |
| 1,297,611 | 3/1919 | Upson. | |
| 2,056,563 | 10/1936 | Budd | 52—615 |
| 2,399,666 | 5/1946 | Een | 52—615 |
| 2,558,132 | 6/1952 | Green. | |
| 3,036,672 | 5/1962 | Kohl | 52—615 |
| 3,181,659 | 5/1965 | Kohl | 52—615 |
| 2,477,852 | 8/1949 | Bacon | 52—615 |

FOREIGN PATENTS

| | | |
|---|---|---|
| 1,262,049 | 1961 | France. |
| 1,269,175 | 1961 | France. |
| 371,240 | 1963 | Switzerland. |
| 494,131 | 1938 | Great Britain. |

OTHER REFERENCES

German printed application 1,004,790, published March 1957, Hess.

JOHN E. MURTAGH, Primary Examiner

UNITED STATES PATENT OFFICE
CERTIFICATE OF CORRECTION

Patent No. 3,538,668    Dated November 10, 1970

Inventor(s) Howard A. Anderson

It is certified that error appears in the above-identified patent and that said Letters Patent are hereby corrected as shown below:

Column 2, line 25, "themseleves" should read -- themselves --. Column 3, line 7, "disloding" should read -- dislodging --. Column 4, line 56, "spcing" should read -- spacing --. Column 7 line 5, "acordane" should read -- accordance --. Column 8, line 55, "confiuration" should read -- configuration --. Column 10, line 72, after "large" insert -- peak --. Column 14, line ? after "184" insert a comma; line 65, "of", first occurrence, should read -- or --. Column 15, line 5, "s  trips" should read -- strips --.

Signed and sealed this 25th day of May 1971.

(SEAL)
Attest:

EDWARD M.FLETCHER, JR.          WILLIAM E. SCHUYLER, JR.
Attesting Officer               Commissioner of Patents